(12) United States Patent
Aharonov

(10) Patent No.: US 8,495,035 B2
(45) Date of Patent: *Jul. 23, 2013

(54) SYSTEMS AND METHODS FOR PROVIDING DATA INTEGRITY PROTECTION IN A STORAGE MEDIUM

(75) Inventor: Arseniy Aharonov, Arad (IL)

(73) Assignee: SanDisk IL Ltd., Kfar Saba (IL)

( * ) Notice: Subject to any disclaimer, the term of this patent is extended or adjusted under 35 U.S.C. 154(b) by 908 days.

This patent is subject to a terminal disclaimer.

(21) Appl. No.: 12/256,880

(22) Filed: Oct. 23, 2008

(65) Prior Publication Data

US 2009/0113215 A1 Apr. 30, 2009

(30) Foreign Application Priority Data

Oct. 30, 2007 (IL) .......................................... 187037

(51) Int. Cl.
*G06F 7/00* (2006.01)
*G06F 17/00* (2006.01)

(52) U.S. Cl.
USPC ........... 707/694; 707/687; 713/153; 713/161; 713/165; 713/167; 713/176

(58) Field of Classification Search
USPC ........................................................ 713/189
See application file for complete search history.

(56) References Cited

U.S. PATENT DOCUMENTS

| | | |
|---|---|---|
| 5,231,666 A | 7/1993 | Matyas |
| 6,226,743 B1 | 5/2001 | Naor et al. |
| 6,701,434 B1 | 3/2004 | Rohatgi |
| 6,959,384 B1 | 10/2005 | Serret-Avila |
| 2005/0063545 A1 | 3/2005 | Fujimoto et al. |
| 2005/0216530 A1 * | 9/2005 | Meller et al. ................... 707/203 |
| 2006/0080553 A1 | 4/2006 | Hall |
| 2006/0107047 A1 | 5/2006 | Bar-El |
| 2007/0101127 A1 | 5/2007 | Butler et al. |

FOREIGN PATENT DOCUMENTS

| | | |
|---|---|---|
| EP | 1517214 | 3/2005 |
| GB | 2431741 | 5/2007 |
| WO | WO 2007004107 A2 * | 1/2007 |

OTHER PUBLICATIONS

International Search Report and Written Opinion for PCT/IL2008/001391, dated Mar. 5, 2009, 13 pages.
International Preliminary Report on Patentability for PCT/IL2008/001391, dated May 14, 2010, 7 pages.

* cited by examiner

*Primary Examiner* — Nathan Flynn
*Assistant Examiner* — Bryan Wright
(74) *Attorney, Agent, or Firm* — Brinks Hofer Gilson & Lione

(57) ABSTRACT

A method for data integrity protection includes arranging data in a plurality of data blocks. A respective block signature is computed over each of the data blocks, thereby generating multiple block signatures. The data blocks and the block signatures in an integrity hierarchy are stored in a storage medium, the hierarchy comprising multiple levels of signature blocks containing signatures computed over lower levels in the hierarchy, culminating in a top-level block containing a top-level signature computed over all of the hierarchy. A modification is made in the data stored in a given data block within the hierarchy. The respective block signature of the given data block is recomputed in response to the modification, and the recomputed block signature is stored in the top-level block for use in verifying a subsequent requests to read data from the given data block.

16 Claims, 3 Drawing Sheets

US 8,495,035 B2

SYSTEMS AND METHODS FOR PROVIDING DATA INTEGRITY PROTECTION IN A STORAGE MEDIUM

FIELD OF THE INVENTION

The present invention relates generally to data storage systems, and specifically to methods and systems for maintaining the integrity of stored data.

BACKGROUND OF THE INVENTION

Structural integrity schemes are used in data storage applications to protect data from being modified without authorization. Such schemes typically use a structure comprising one or more levels of signatures to protect data integrity.

SUMMARY OF THE INVENTION

Various embodiments of a system and method for data integrity protection are possible. An embodiment of a method for data integrity protection may include arranging data in a plurality of data blocks, the data being so arranged for storage in a storage medium. A respective block signature is computed over each of the data blocks, thereby generating multiple block signatures. The data blocks and the block signatures are stored in an integrity hierarchy in the storage medium. The hierarchy includes multiple levels of signature blocks containing signatures computed over lower levels in the hierarchy, culminating in a top-level block containing a top-level signature computed over all of the hierarchy. When a modification is made to the data stored in a given data block within the hierarchy, the respective block signature of the given data block is recomputed, and the recomputed block signature is stored in the top-level block for use in verifying a subsequent request to read data from the given data block.

In one embodiment, the storage medium may include a non-volatile memory.

In disclosed embodiments, upon receiving a request to read a data item from the given data block after making the modification, a new block signature of the specified block may be computed and the new block signature may be verified against the recomputed block signature in the top-level block.

In some embodiments, storing the recomputed block signature in the top-level block may include recomputing the signatures over all of the levels in the hierarchy in response to the modification. Typically, the signatures are recomputed over all of the levels, and the recomputed block signatures are removed from the top-level block. Typically, recomputing the signatures over all of the levels in the hierarchy includes calculating the signatures during an idle period of the storage medium. The recomputed block signatures are stored, including storing respective recomputed block signatures for multiple data blocks in which the data have been modified prior to recomputing the signatures over all of the levels.

In some embodiments, arranging the data may include grouping together data items of a similar type in at least one of the data blocks.

The items of data may be cryptographic secrets.

Typically, storing the recomputed block signature may include recomputing the top-level signature over the signatures in the top-level block, including the recomputed block signature.

Another embodiment may provide apparatus for data protection, including a storage medium for storing data in a plurality of data blocks, and a storage controller, which is configured to compute a respective block signature over each of the data blocks, thereby generating multiple block signatures. The storage controller is configured to store the data blocks and the block signatures in an integrity hierarchy in the storage medium, the hierarchy including multiple levels of signature blocks containing signatures computed over lower levels in the hierarchy, culminating in a top-level block containing a top-level signature computed over all of the hierarchy, to make a modification in the data stored in a given data block within the hierarchy, and responsively to the modification, to recompute the respective block signature of the given data block and to store the recomputed block signature in the top-level block for use in verifying a subsequent request to read data from the given data block.

An additional embodiment may provide a software product, including a machine-readable medium in which program instructions are stored, which instructions, when read by a programmable controller that is coupled to a storage medium, cause the controller to arrange data in a plurality of data blocks, the data being so arranged for storage in a storage medium, to compute a respective block signature over each of the data blocks, thereby generating multiple block signatures, to store the data blocks and the block signatures in an integrity hierarchy in a storage medium, the hierarchy including multiple levels of signature blocks containing signatures computed over lower levels in the hierarchy, culminating in a top-level block containing a top-level signature computed over all of the hierarchy, to make a modification in the data stored in a given data block within the hierarchy, and responsively to the modification, to recompute the respective block signature of the given data block and to store the recomputed block signature in the top-level block for use in verifying a subsequent request to read data from the given data block.

The present invention will be more fully understood from the following detailed description of the embodiments thereof, taken together with the drawings in which:

DETAILED DESCRIPTION OF EMBODIMENTS

Overview

Figure 1:
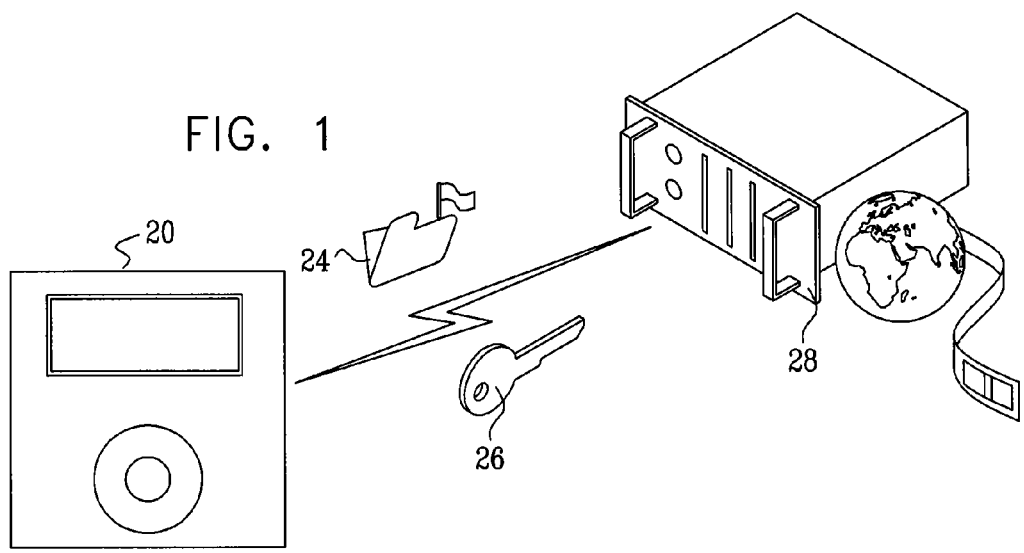
FIG. 1 is a schematic, pictorial illustration of a device for storing data using a hierarchical integrity scheme, in accordance with an embodiment of the present invention.

Secure data storage systems often use signatures to provide integrity protection. In the context of the present patent application and in the claims, the term "signature" is used broadly to refer to any code that is calculated over an element of data and may subsequently be used to verify that the data element has not changed since the code was calculated. There are many types of signatures utilized in secure data storage systems. These include, but are not limited to—MAC, hash, CRC, PGP, and PKI:

A cryptographic message authentication code (MAC) is a short piece of information used to authenticate a message.

A cryptographic hash function is a transformation that takes an input and returns a fixed-size string, which is called the hash value.

A cyclic redundancy check (CRC) is a type of function that takes as input a data stream of any length and produces as output a value of a certain fixed size.

Pretty Good Privacy (PGP) encryption uses public-key cryptography and includes a system which binds public keys to a user name.

A public key infrastructure (PKI) is an arrangement that binds public keys with respective user identities by means of a certificate authority.

In some hierarchical data integrity schemes, a digital signature is created for each data block being stored in a storage medium and is updated when any data is added or changed. An upper-level signature is computed over the signatures of the data blocks to protect the integrity of the signatures. The upper-level signatures may themselves be protected by one or more levels of super-signatures, in a hierarchical manner, up to the top-level signature, which verifies the integrity of the entire data structure. The successive levels of signatures are stored in corresponding levels of signature blocks, up to a top-level block. Upon receiving a request to access a particular data block, the storage system typically checks the data in the block against the relevant signatures in all of the levels in the hierarchy to verify that the data and signatures are valid and have not been tampered with.

When a data block is modified, multiple levels of signature blocks, up to the top-level block, must be updated as well. Writing data to this type of secure data storage architecture has a significant drawback, especially in devices that use embedded or flash memory: Each attempt to write an item of data is accompanied by corresponding updates to a set of signature values, beginning with the data block signature and progressing iteratively, upward through the hierarchy, to the top-level signature. Updating these signatures is necessary to ensure that the integrity of the data structure has not been compromised. These updates can take a significant amount of overhead, adding to the amount of time that it takes to write data items to secure data storage.

Embodiments of the present invention that are described hereinbelow address this problem by writing changed data block signatures to a modified block signature list in the storage medium. Typically, the modified block signature list is stored in the top-level block of the integrity hierarchy. When a request is made to modify the data stored in a given data block, the storage controller stores the updated data in the given block. The controller then computes the block signature for the modified data block and stores it in the modified block signature list. Subsequent data modification requests are treated identically, whereby each data block modification is performed in tandem with an update to the modified block signatures list in the top level block. Periodically, all of the modifications in the list are applied in one integrated operation, referred to here as a "hierarchy synchronization" process, detailed below.

There are a number of performance advantages gained by embodiments of this invention, including:

The procedure described above permits the storage controller to complete requested data modifications rapidly, without updating the entire hierarchy. Synchronization of the entire integrity hierarchy can usually be performed when the storage medium is idle.

The same data block may change a number of times between hierarchy synchronizations. Signatures for each level of the hierarchy directly above the modified block will only be computed and updated once, rather than each time the data block changes.

Multiple data blocks signed by signatures contained within the same signature block may change between hierarchy synchronizations. The signature over the signature block will only be computed and updated once, rather than each time a block signature changes.

When read requests are received, the block signature is computed and may be verified directly against a verified block signature for the data item in the modified signatures block. The ability to verify data item integrity with a single read operation eliminates the need to perform multiple read operations to obtain the relevant set of signature values from the secure data storage for verification purposes.

System Description

FIG. 1 is a schematic, pictorial illustration of a media player device 20 that uses a hierarchical integrity scheme for secure data storage, in accordance with an embodiment of the present invention. Device 20 downloads an encrypted media file 24 from a media server 28 or other source. In order to decrypt and play the media file, device 20 must also download an associated cryptographic secret, in the form of a secret key 26, from server 28. Key 26 itself is typically downloaded to device 20 in a form that is inaccessible to the user of the device. Therefore, the user is unable to change, duplicate, or make any other unauthorized use of the key. Optionally, for enhanced security, the keys themselves may be stored in the device in encrypted form.

Media file 24 and key 26 are stored in memory in device 20. Typically, device 20 stores many different media files, each with its own unique key. In order to prevent unauthorized access to and use of the keys (and hence of the media files), the keys are arranged in a secure hierarchical integrity structure in the memory of device 20. This structure, as described in detail below with reference to FIG. 3, contains the keys along with multiple levels of signatures. When the user of device 20 attempts to access a given media file, the device checks the signatures that apply to the key for the file in order to verify that the key is authentic and has not been tampered with or copied illegally. After verifying the key in this manner, the device uses the key to decrypt and play the media file.

The embodiment shown in FIG. 1 presents one application of the present invention solely by way of example and for the purpose of illustration only. The principles of the present invention may be used in any system that requires data integrity and is amenable to a hierarchical integrity scheme. The data secured by the hierarchical integrity scheme may comprise cryptographic secrets, as in the present example, or any other type of sensitive data.

Figure 2:
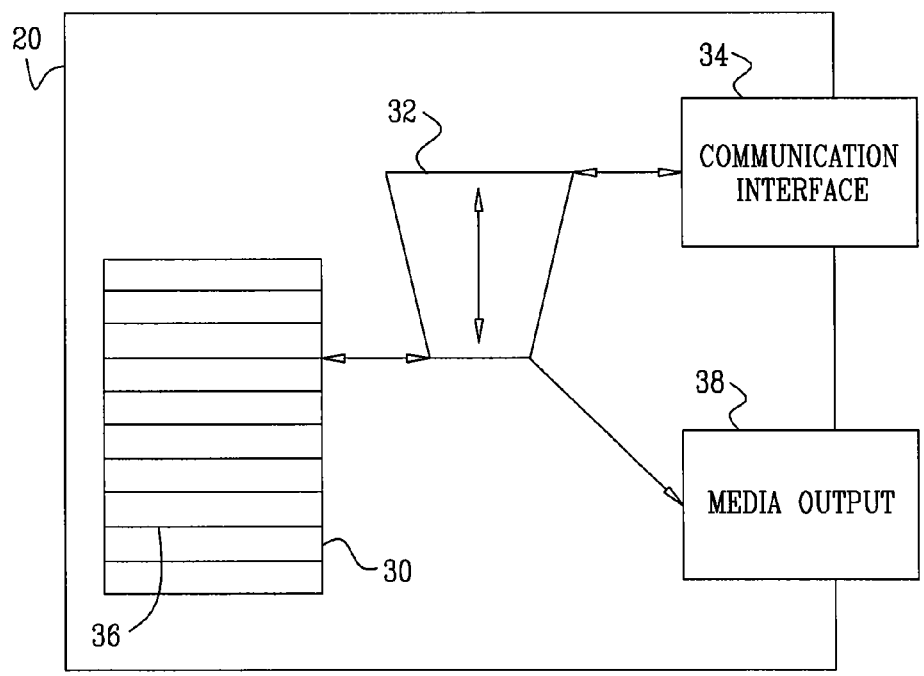
FIG. 2 is a block diagram that schematically illustrates internal details of the device of FIG. 1, in accordance with an embodiment of the present invention.

FIG. 2 is a block diagram that schematically illustrates internal details of device 20, in accordance with an embodiment of the present invention. An interface 34 passes data from an external source to a storage controller 32. As explained above, the data may include both media files and associated secret keys. Storage controller 32 stores the data in a storage medium, such as a flash memory 30. Flash memory is non-volatile, which means that it does not need power to maintain the information stored in the memory. Memory 30 is divided into access units, i.e., groups of memory cells that are written to and read from in a single write or read operation. In flash memory, the access unit is a page 36, which typically comprises between 512 and 2048 Kb.

Controller 32 is typically a programmable processing device, which operates under the control of program instructions that are stored in a machine-readable medium, such as flash memory 30 or other electronic memory, or in magnetic or optical media. The instructions cause the controller to perform the data integrity-related functions that are described herein. Alternatively or additionally, some or all of the functions of the controller may be performed by dedicated processing logic.

Figure 3:
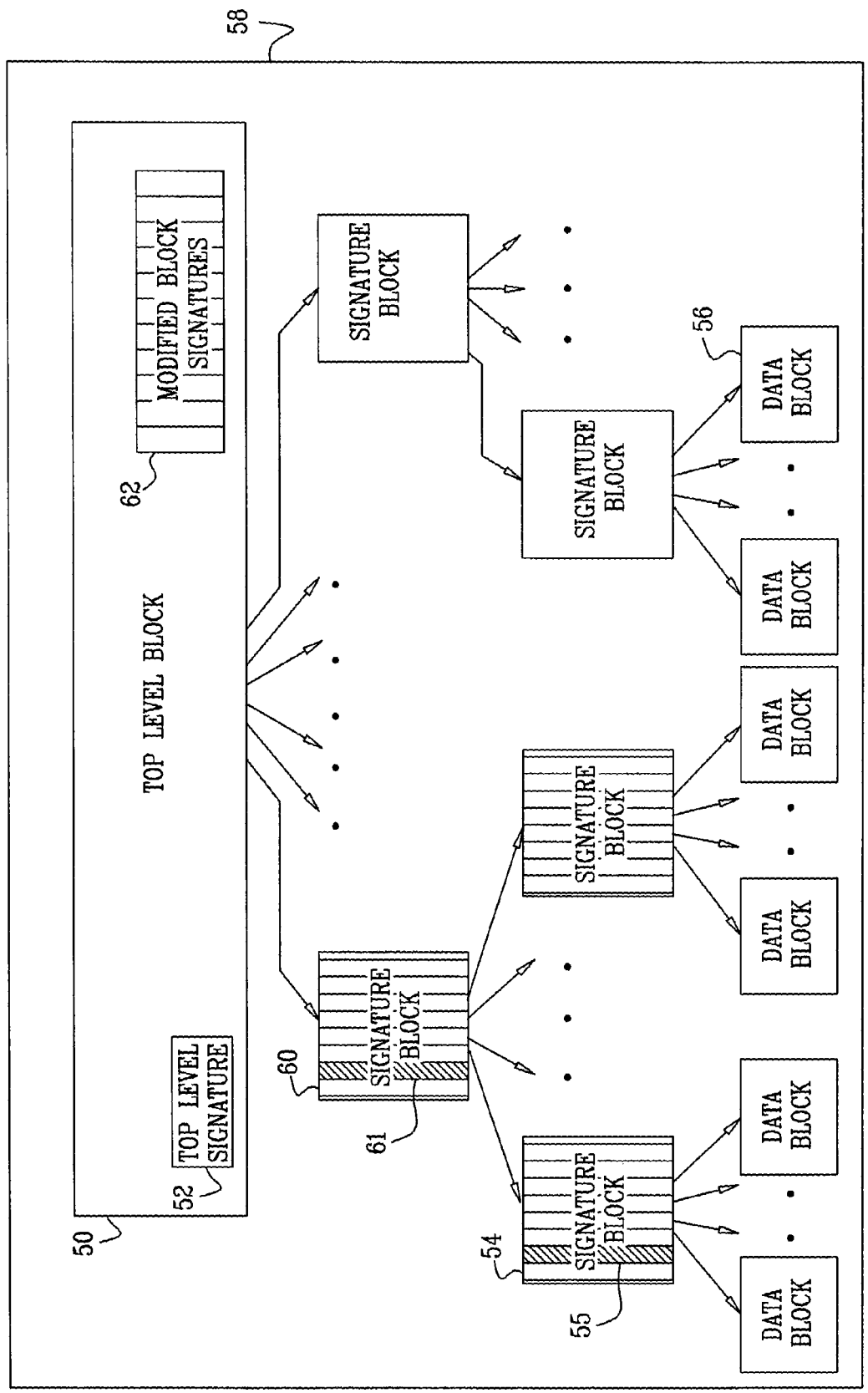
FIG. 3 is a block diagram that schematically illustrates a data structure used to store data with hierarchical integrity, in accordance with an embodiment of the present invention.

Typically, controller 32 stores the media files and secret keys in different, respective locations in flash memory 30. The keys are stored as data items in data blocks in a hierarchical integrity structure, as shown in FIG. 3. Each block may hold a single data item, or multiple data items may be grouped together in one or more of the blocks.

Controller 32 computes a signature over each block, as well as upper-level signatures, to form a hierarchical integrity structure as shown below in FIG. 3. This structure is stored in flash memory 30. When the user of device 20 first asks to play a particular media file, the controller reads the page containing the key from the memory and checks the block signature and upper-level signatures against the signature values that are stored in the flash memory. If the values of the signatures match, the controller uses key 26 (FIG. 1) to decrypt the media file and transfers the decrypted file to a media output 38, such as an audio speaker, for playback. If the signature values do not match, the controller determines that the integrity of the signature has been corrupted and returns a failure message.

Although the present embodiment is described with reference to flash memory, the same principles apply to other types of storage media, including magnetic and optical, as well as electronic, memory:

Magnetic storage refers to the storage of data on a magnetized medium, such as a magnetic hard disk. Magnetic storage uses different patterns of magnetization in a magnetizable material to store data and is another form of non-volatile memory.

One form of optical storage uses tiny pits etched on the surface of a circular disc to store information. This information is read by illuminating the surface with a laser diode and observing the reflection. Optical disc storage is a form of non-volatile memory.

One form of electronic memory is random access memory (RAM). It loses the stored information when not electrically powered and is a form of volatile memory. Other types of programmable electronic memory are non-volatile, like flash memory.

Each of these types of storage media is characterized by access units of a particular size, such as blocks or tracks on a disk.

Structural Integrity with Update Optimization Scheme

FIG. 3 is a diagram that schematically illustrates a data structure 58 used by controller 32 to store data in memory 30 (FIG. 2) with hierarchical integrity, in accordance with an embodiment of the present invention. As explained above, cryptographic secrets (such as key 26) are stored in data blocks 56. Each block may hold a single data item, or multiple data items may be grouped within the data blocks.

Each data block is signed by the controller (FIG. 2) with a single block signature 55. The controller may compute the signatures using any suitable method known in the art, such as the MAC, hash, CRC, PGP, or PKI types of computations mentioned above. These block signatures constitute the lowest signature-level in structure 58. The block signatures themselves are grouped in signature blocks 54. These signature blocks are arranged in an integrity structure comprising multiple levels of signatures, including at least one upper level containing one or more upper-level signatures computed over the block signatures.

In the example shown in FIG. 3, each signature block 54 is itself protected by an upper-level signature 61 computed by the controller over the signature(s) in the lower-level signature block. The upper-level signatures are grouped in upper-level signature blocks 60, which constitute the next signature level in the integrity hierarchy.

The integrity hierarchy culminates in a top-level signature block 50, which typically contains the upper-level signatures of upper-level signature blocks 60. The controller computes a top-level signature 52 over the upper-level signature(s) of all of blocks 60, and thus protects the integrity of the whole data structure, including the data blocks and the signatures. The hierarchical structure that is shown in FIG. 3 is just one example of an integrity structure that may be used in this system. The principles of the invention may be applied to any integrity structure that has at least one upper-level signature over block signatures. Although the hierarchy in structure 58 is shown, by way of example, as comprising three levels of signature blocks 54, 60 and 50, the principles of the present invention may be applied in integrity structures having any practical number of levels of signature blocks, two or greater.

Data structure 58 also comprises a modified block signatures list 62, which holds block signatures 55 that have been modified since the last hierarchy synchronization, as explained above. Typically, list 62 is stored in top-level block 50, as shown in FIG. 3, and is protected by top-level signature 52 together with the other contents of the top-level block. The use of this modified block signature list in relation to the hierarchy of data and signature blocks in flash memory 30 is described hereinbelow.

Figure 4:
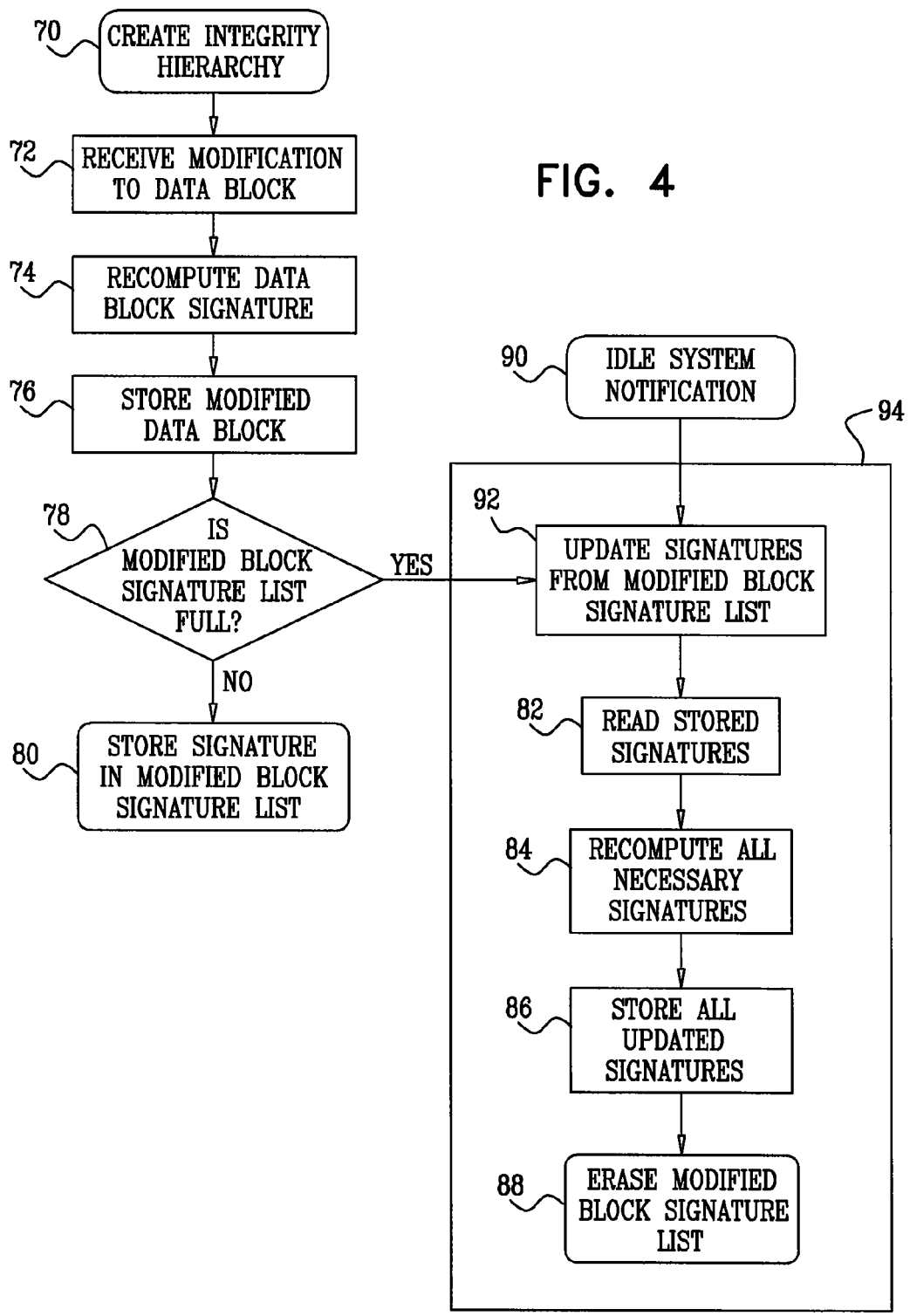
FIG. 4 is a flow chart that schematically illustrates a method for updating stored data, in accordance with an embodiment of the present invention.

FIG. 4 is a flow chart that schematically illustrates a method for updating data stored in hierarchical integrity data structure 58, in accordance with an embodiment of the present invention.

Upon initialization of device 20 (FIG. 2), controller 32 creates an integrity hierarchy in the form of data structure 58, as shown above in FIG. 3, at a structure creation step 70. The controller stores the structure in a certain location in memory 30. (Typically, this initialization is performed only once, and not every time the device is powered up.) During operation of the device, controller 32 may receive a modification to one of data blocks 56, at a data modification step 72. For example, the user of the device may download a new media file 24 and the corresponding key 26, which is then stored in the appropriate data block in the hierarchical integrity structure. In response to the change in data block 56, controller 32 recomputes block signature 55 of this data block, at a signature recomputation step 74. Controller 32 stores the modified data block 56 in structure 58, at a block storage step 76.

The controller determines whether there is free space available to store the recomputed block signature in modified block signature list 62, at a modified block list checking step 78. If there is space available in the modified block list, the controller saves the verified block signature 55 in the modified block list, at a signature storage step 80. As noted above, the modified block list is typically stored in top-level block 50. Upon storage of the recomputed block signature in the modified block list, the controller may recompute top-level signature 52 so that it correctly corresponds to the contents of the top-level block.

If controller 32 determines at step 78 that the modified block list is full, it performs a hierarchy synchronization 94. To start the synchronization, the controller copies all of the modified block signatures to the appropriate signature blocks in structure 58, in a multi-signature update step 92. The controller then reads the signatures stored in all of the appropriate signature blocks through all levels of structure 58, in a signature readout step 82. The controller computes the appropriate signature values over all signature blocks that have been modified since the last hierarchy synchronization, proceeding upward through the hierarchy to the top-level signature, in a multi-signature computation step 84.

Thus, for example, assuming data items have been updated in data block 56 in the hierarchy, the controller performs the following computations:

Compute a value for the upper-level signature of signature block 54, including updated signature 55.

Compute an upper-level signature value over the value of upper-level signature 61 together with the previously-computed values of the other upper-level signatures in the leftmost upper-level block 60.

Compute a new top-level signature 52 value over this upper-level signature together with the previously-computed values of the signatures of the other upper-level blocks.

The recomputed signatures are stored in structure 58 in a signature storage step 86. In practice controller 32 may have only limited RAM to use in the signature computations and may be limited to writing one block at a time to memory 30 as an atomic operation. Therefore, steps 84 and 86 may be interleaved, with blocks 54, 60 and 50 written to the memory in successive write operations, moving upward through the hierarchy, and each successive signature computed after the previous write operation has been completed. Once all of the modified block signatures have been stored in structure 58, the controller erases modified block signature list (FIG. 3) in erasure step 88.

Alternatively or additionally, when device 20 is inactive, for example when no data is being read from or written to structure 58, controller 32 may initiate hierarchy synchronization 94 in an idle system notification step 90.

When controller 32 receives a request to access a data item in a given data block 56, it checks modified block signature list 62 in top-level block 50 to determine whether a modified block signature for this data block is stored in the list. If so, the controller computes a new signature of the data block and verifies it against the signature value in list 62. Typically, the controller also recomputes and verifies top-level signature 52. Otherwise, the controller verifies the integrity of the given data block against the signatures in all the levels of the hierarchy. The steps involved in this verification process are described in greater detail, for example, in the above-mentioned patent application entitled "Optimized Hierarchical Integrity Protection for Stored Data." In either case, once the controller has verified that the integrity of the data structure is intact, it reads out the requested data item. In the case of media player device 20 (FIG. 1), for example, the controller may use the data item (key 26) to decrypt and play the corresponding media file 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data integrity protection, comprising:
arranging data in a plurality of data blocks, the data being so arranged for storage in a storage medium comprising non-volatile memory;
computing a respective block signature over each of the data blocks, thereby generating multiple block signatures;
storing the data blocks and the block signatures in an integrity hierarchy in the storage medium, the integrity hierarchy comprising multiple levels of signature blocks containing signatures computed over lower levels in the integrity hierarchy, culminating in a top-level block containing a top-level signature computed over all of the integrity hierarchy;
making a modification in the data stored in a given data block within the integrity hierarchy;
responsively to the modification, recomputing the respective block signature of the given data block; and
storing the recomputed block signature in a modified block signature list stored in the top-level block, the modified block signature list comprising a list of block signatures that have been modified since a hierarchy synchronization;
upon receiving a request to read a data item from the given data block after making the modification:
computing a new block signature of the specified block; and
verifying the new block signature against the recomputed block signature in the modified block signature list stored in the top-level block;
recomputing the signatures over all of the levels in the integrity hierarchy after storing the recomputed block signature in the modified block signature list;
after recomputing the signatures over all of the levels, removing the recomputed block signatures from the modified block signature list stored in the top-level block.

2. The method according to claim 1, wherein recomputing the signatures over all of the levels in the integrity hierarchy comprises calculating the signatures during an idle period of the storage medium.

3. The method according to claim 1, wherein storing the recomputed block signature in the modified block signature list comprises storing, in the modified block signature list, respective recomputed block signatures for multiple data blocks in which the data have been modified prior to recomputing the signatures over all of the levels.

4. The method according to claim 1, wherein arranging the data comprises grouping together data items of a similar type in at least one of the data blocks.

5. The method according to claim 1, wherein the data comprise cryptographic secrets.

6. The method according to claim 1, wherein storing the recomputed block signature in the modified block signature list comprises recomputing the top-level signature over the signatures in the top-level block, including the recomputed block signature.

7. A method for data integrity protection, comprising:
storing data in a plurality of data blocks in a storage medium comprising non-volatile memory;
computing, by a storage controller, a respective block signature over each of the data blocks, thereby generating multiple block signatures;
storing the data blocks and the block signatures in an integrity hierarchy in the storage medium, the integrity hierarchy comprising multiple levels of signature blocks containing signatures computed over lower levels in the integrity hierarchy, culminating in a top-level block containing a top-level signature computed over all of the integrity hierarchy;

making, by the storage controller, a modification in the data stored in a given data block within the integrity hierarchy;

recomputing, by the storage controller, the respective block signature of the given data block, responsively to the modification; and storing, by the storage controller, the recomputed block signature in a modified block signature list stored in the top-level block, the modified block signature list comprising a list of block signatures that have been modified since a hierarchy synchronization;

upon receiving a request to read a data item from the given data block after making the modification:

computing, by the storage controller, a new block signature of the specified block; and verifying, by the storage controller, the new block signature against the recomputed block signature in the modified block signature list stored in the top-level block;

recomputing, by the storage controller, the signatures over all of the levels in the integrity hierarchy after storing the recomputed block signature in the modified block signature list;

after recomputing the signatures over all of the levels, removing, by the storage controller, the recomputed block signatures from the modified block signature list stored in the top-level block.

8. A data storage system that provides data integrity protection, the data storage system comprising:

a non-volatile memory; and a processor for managing data stored in the non-volatile memory, the controller configured to:

arrange data in a plurality of data blocks for storage in the non-volatile memory;

compute a block signature over each data block of the plurality of data blocks, thereby generating multiple block signatures;

store the data blocks and the block signatures in an integrity hierarchy in the non-volatile memory, the integrity hierarchy comprising multiple levels of signature blocks containing signatures computed over lower levels in the integrity hierarchy, culminating in a top-level block containing a top-level signature computed over all of the integrity hierarchy;

modify the data stored in a given data block within the integrity hierarchy;

recompute the respective block signature of the given data block in response to the modification; and storing the recomputed block signature in a modified block signature list stored in the top-level block, the modified block signature list comprising a list of block signatures that have been modified since a hierarchy synchronization;

upon receiving a request to read a data item from the given data block after making the modification:

compute a new block signature of the specified block; and verify the new block signature against the recomputed block signature in the modified block signature list stored in the top-level block;

recompute the signatures over all of the levels in the integrity hierarchy after storing the recomputed block signature in the modified block signature list;

after recomputing the signatures over all of the levels, remove the recomputed block signatures from the modified block signature list stored in the top-level block.

9. The data storage system of claim 8, wherein to recompute the signatures over all of the levels in the integrity hierarchy, the controller is further configured to calculate the signatures during an idle period of the non-volatile memory.

10. The data storage system of claim 8, wherein to store the recomputed block signature in modified block signature list, the controller is further configured to store, in the modified block signature list, recomputed block signatures for multiple data blocks in which the data have been modified prior to recomputing the signatures over all of the levels.

11. The data storage system of claim 8, wherein to arrange the data, the controller is configured to group together data items of a similar type in at least one of the data blocks.

12. The data storage system of claim 8, wherein the data comprise cryptographic secrets.

13. The data storage system of claim 8, wherein to store the recomputed block signature in the modified block signature list, the controller is configured to recomputed the top-level signature over the signatures in the top-level block, including the recomputed block signature.

14. The data storage system of claim 8, wherein the processor computes the block signature using at least one of a cryptographic message authentication code (MAC), a cryptographic hash, a cyclic redundancy check (CRC), pretty good privacy (PGP) encryption, or a public key infrastructure (PKI).

15. The method of claim 7, wherein the block signature is computed using at least one of a cryptographic message authentication code (MAC), a cryptographic hash, a cyclic redundancy check (CRC), pretty good privacy (PGP) encryption, or a public key infrastructure (PKI).

16. The method of claim 1, wherein the block signature is computed using at least one of a cryptographic message authentication code (MAC), a cryptographic hash, a cyclic redundancy check (CRC), pretty good privacy (PGP) encryption, or a public key infrastructure (PKI).

* * * * *